(12) United States Patent
Tsai

(10) Patent No.: US 8,371,195 B2
(45) Date of Patent: Feb. 12, 2013

(54) LATHE MACHINE

(75) Inventor: Peter T. H. Tsai, Taipei (TW)

(73) Assignee: Alex-Tech Machinery Industrial Co., Ltd., Taichung Hsien (TW)

( * ) Notice: Subject to any disclaimer, the term of this patent is extended or adjusted under 35 U.S.C. 154(b) by 814 days.

(21) Appl. No.: 12/563,292

(22) Filed: Sep. 21, 2009

(65) Prior Publication Data

US 2011/0067535 A1 Mar. 24, 2011

(51) Int. Cl.
*B23B 23/00* (2006.01)
(52) U.S. Cl. ............................ 82/121; 82/148; 82/161
(58) Field of Classification Search .............. 82/121, 82/148, 157, 158, 161, 1.2–1.5; 29/27 R–27 C, 29/42–44, 45, 46, 47, 37 R–38 F; 74/813 R–813 L
See application file for complete search history.

(56) References Cited

U.S. PATENT DOCUMENTS

| | | | | |
|---|---|---|---|---|
| 4,054,975 A | * | 10/1977 | Lundstrom | 29/27 C |
| 4,180,894 A | * | 1/1980 | Link | 29/36 |
| 6,865,789 B2 | * | 3/2005 | Katoh et al. | 29/40 |
| 7,219,407 B2 | * | 5/2007 | Schneider et al. | 29/27 C |

FOREIGN PATENT DOCUMENTS

| | | | |
|---|---|---|---|
| DE | 4142418 A1 | * | 6/1993 |
| JP | 2003080404 A | * | 3/2003 |

OTHER PUBLICATIONS

English translation of JP 2003-080404, 2003, pp. 1-3.*

\* cited by examiner

*Primary Examiner* — Andrea Wellington
*Assistant Examiner* — Sara Addisu
(74) *Attorney, Agent, or Firm* — Nixon & Vanderhye P.C.

(57) ABSTRACT

A lathe machine includes a turret having a saddle movable along a longitudinal direction toward a headstock, and a turret body mounted on the saddle and movable along a transverse direction on the saddle, and a tailstock having a bottom seat movable along the longitudinal direction toward the headstock, and a tailstock body mounted movably on the bottom seat. A first coupler unit is provided to couple releasably the saddle and the bottom seat so that the bottom seat can be driven by the saddle to move along the longitudinal direction toward the headstock. A second coupler unit is provided to couple releasably the turret body and the tailstock body so that the tailstock body can be driven by the turret body to move along the transverse direction.

6 Claims, 11 Drawing Sheets

LATHE MACHINE

BACKGROUND OF THE INVENTION

1. Field of the Invention

This invention relates to a lathe, more particularly to a lathe machine for processing a bore in a workpiece.

2. Description of the Related Art

A computer-numerical-controlled lathe, or commonly called CNC lathe, generally includes a headstock, a turret, and a tailstock. The headstock is used for clamping fixedly a workpiece. The turret has a rotatable turret disk. A plurality of cutters are mounted on the turret disk so that a user can select the type of cutter needed for a cutting operation of a workpiece. The tailstock is used only when the workpiece is long, and is used to abut against the workpiece, so that a stable cutting operation of the workpiece can be achieved.

When the lathe machine has to perform a boring process of the workpiece, a boring cutter is mounted on the turret disk. Since the boring cutter is mounted fixedly on the turret disk, to prevent inaccuracy caused by vibration of the cutter, a suspended length of the cutter should not be long. Hence, the length of the cutter extending out of the turret disk is limited. As a result, the boring of the workpiece cannot be made deep. If the cutter is bored deeply into the workpiece, the workpiece is likely to bump onto the turret disk.

SUMMARY OF THE INVENTION

Therefore, the object of the present invention is to provide a lathe machine that is capable of overcoming the aforementioned drawbacks of the prior art.

According to one aspect of this invention, a lathe machine comprises a bed, a headstock mounted fixedly on a front part of the bed for holding a workpiece, a turret, a tailstock, and first and second coupler units. The turret includes a saddle mounted on a rear part of the bed and movable along a longitudinal direction toward the headstock, and a turret body mounted on the saddle and movable along a transverse direction on the saddle. The tailstock includes a bottom seat mounted on a rear part of the bed at one side of the saddle and movable along the longitudinal direction toward the headstock, a tailstock body mounted movably on the bottom seat, and a cutter disposed on a front end of the tailstock body and adapted to machine the workpiece. The first coupler unit is provided to couple releasably the saddle and the bottom seat so that the bottom seat can be driven by the saddle to move along the longitudinal direction toward the headstock. The first coupler unit includes a connecting seat provided on one of the saddle and the bottom seat, and a first plunger provided on the other one of the saddle and the bottom seat and being extendable retractably into the connecting seat. The second coupler unit is provided to couple releasably the turret body and the tailstock body so that the tailstock body can be driven by the turret body to move along the transverse direction. The second coupler unit includes a magnetic attraction member provided on one of the turret body and the tailstock body, and a magnetically attractable member provided on the other one of the turret body and the tailstock body to be attracted by the magnetic attraction member.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
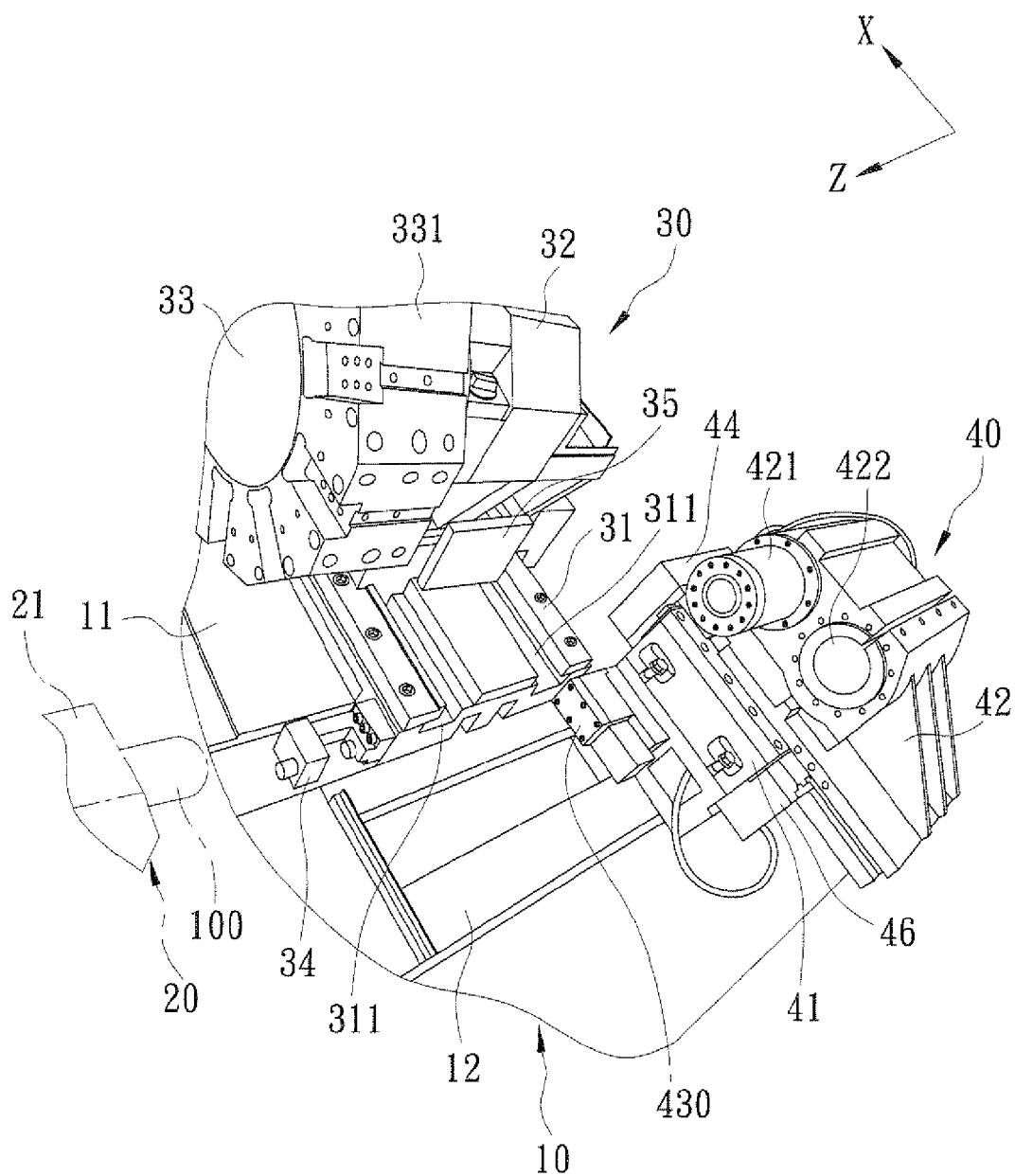
FIG. 1 is a fragmentary perspective view of a lathe machine according to the preferred embodiment of the present invention.
Figure 2:
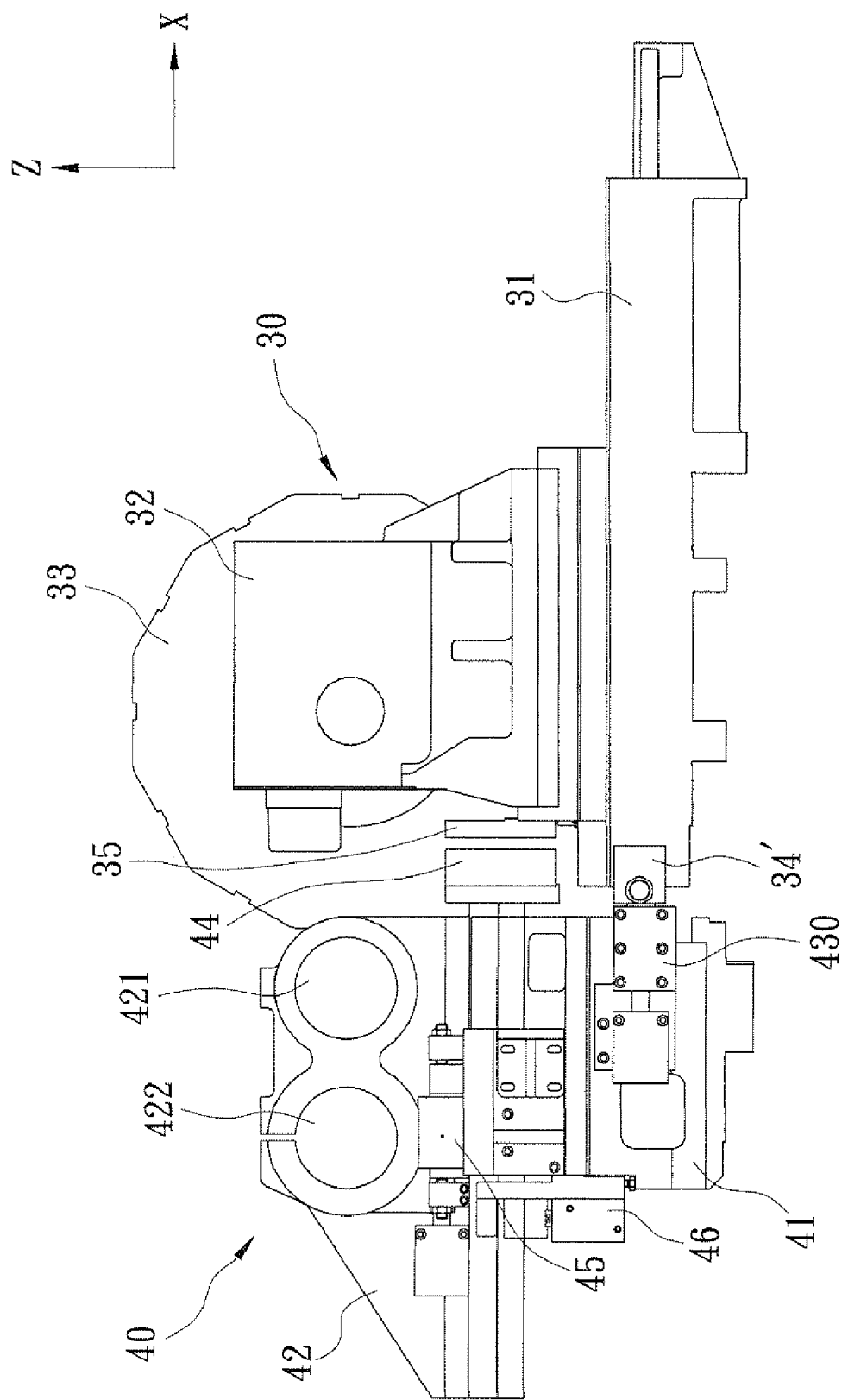
FIG. 2 is a schematic rear view of a turret and a tailstock of the preferred embodiment.

Referring to FIGS. 1 to 11, a lathe machine according to the preferred embodiment of the present invention's shown to comprise abed 10, a headstock 20, a turret 30, a tailstock 40, and first and second coupler units. The lathe machine is a computer-numerical-controlled (CNC) lathe in this embodiment.

The bed 10 is provided with a first slide rail 11 and a second slide rail 12 both extending along a longitudinal direction (Z). The second slide rail 12 is disposed at a right side of the first slide rail 11.

The headstock 20 is mounted fixedly on a front part of the bed 10, and has a chuck 21 (see FIG. 11) fixed at an end of a rotatable main spindle (not shown) of the headstock 20 for clamping fixedly a workpiece 100.

The turret 30 includes a saddle 31, a turret body 32, and a turret disk 33. The saddle 31 is mounted on a rear part of the bed 10, is disposed slidably on the first slide rail 11, and is driven by a servomotor (not shown) to move along the longitudinal direction (Z) toward the headstock 20. The saddle 31 has a top face provided with two spaced-apart guide rails 311 extending along a transverse direction (X). The turret body 32 is mounted on the saddle 31, and is driven by a servomotor (not shown) to move slidably along the guide rails 311 and in the transverse direction (X). The turret disk 33 is connected rotatably to the turret body 32, and has a plurality of mounting faces 331 provided on an outer peripheral surface thereof for mounting various kinds of cutters (not shown) to perform various kinds of cutting operations on the workpiece 100.

The tailstock 40 includes a bottom seat 41 and a tailstock body 42. The bottom seat 41 is mounted on the rear part of the bed 10 at a right side of the saddle 31, and has a top side provided with a transverse rail 412 (see FIG. 3), and a bottom side provided with a slide plate 411 engaged movably with the second slide rail 12 of the bed 10, as best shown in FIG. 4, so that the entire tailstock 40 is slidable along the longitudinal direction (Z) toward the headstock 20. The tailstock body 42 is mounted on the bottom seat 41, and has a bottom slide 423 (see FIG. 3) engaged movably with the transverse rail 412 so that the tailstock body 42 is movable along the transverse rail 412 and in the transverse direction (X). The tailstock body 42 further has a mandrel 421 provided on a front end thereof for mounting of a center (not shown), a tool-mounting hole 422 formed in the front end of the tailstock body 42 at a right side of the mandrel 421, and a cutter 200 (see FIG. 11) having a tool spindle 201 inserted retractably into the tool-mounting hole 422, and a boring blade 202 provided on an end of the tool spindle 201. The tool spindle 201 is extendable forwardly to a predetermined length so that the boring blade 202 can bore the workpiece 100 to form a large diameter inner hole or a deep inner hole.

The first coupler unit is provided to couple releasably the saddle 31 and the bottom seat 41. In this embodiment, the first coupler unit includes two connecting seats 34, 34' (see FIGS. 1, 2, 5, and 6) and two first plungers 432, 432' (see FIGS. 5 and 6). The connecting seats 34, 34' are disposed respectively on a right front end and a right rear end of the saddle 31. Each connecting seat 34, 34' has a substantially C-shaped body with two opposite end portions, and defines a coupling groove 342, 342'. The connecting seat 34 further has two contact pins 341 (see FIGS. 5 and 6) disposed respectively on the two opposite end portions thereof, extending partially into the coupling groove 342, and spaced apart from each other at a predetermined distance. The connecting seat 34' further has a contact pin 341' (see FIGS. 5 and 6) disposed on one of the end portions of the connecting seat 34', extending partially into the coupling groove 342', and spaced apart from the other end portion of the connecting seat 34' at a predetermined distance.

Figure 6:
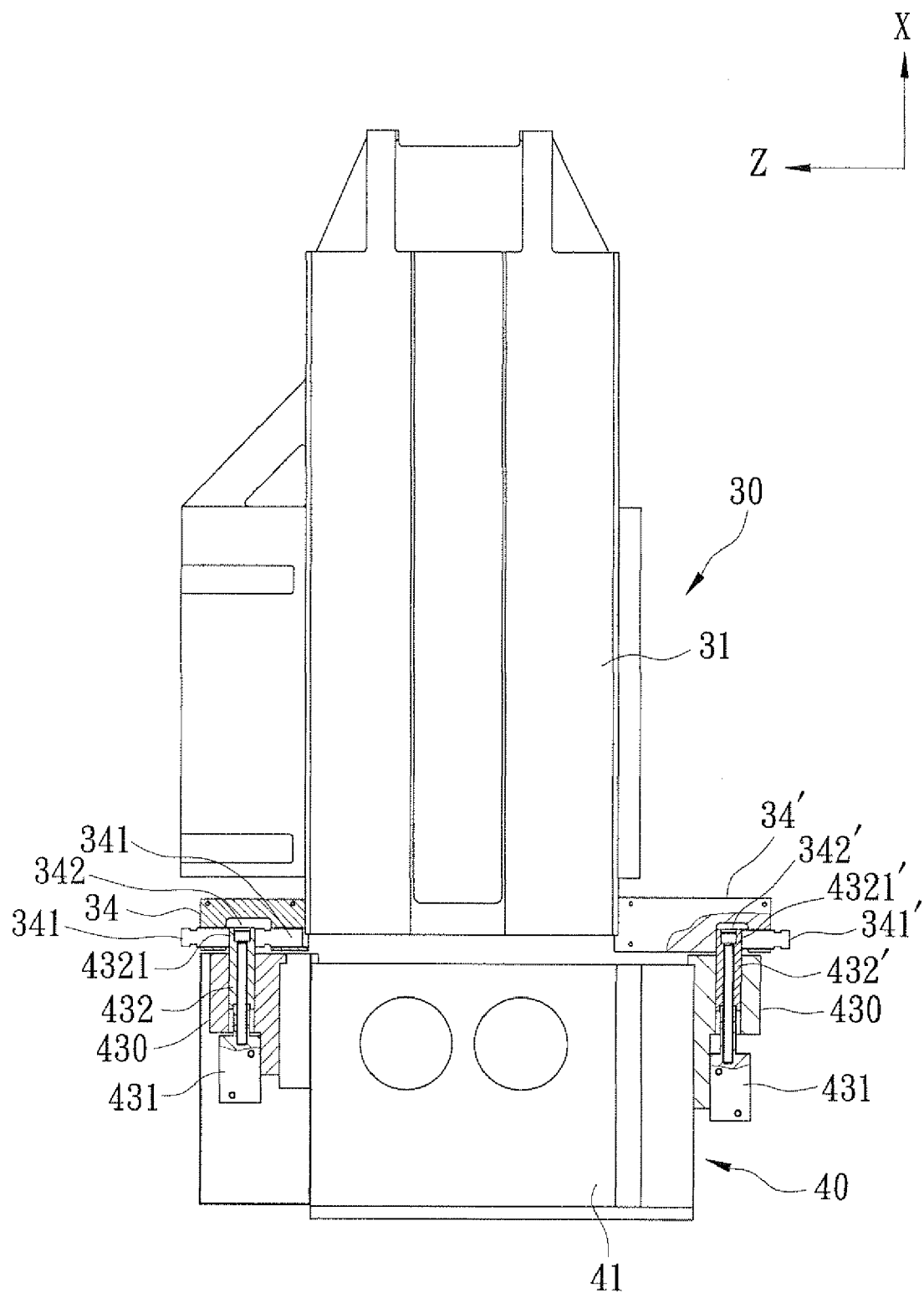
FIG. 6 is a view similar to FIG. 5, but illustrating how the tailstock is connected to the turret.
Figure 7:
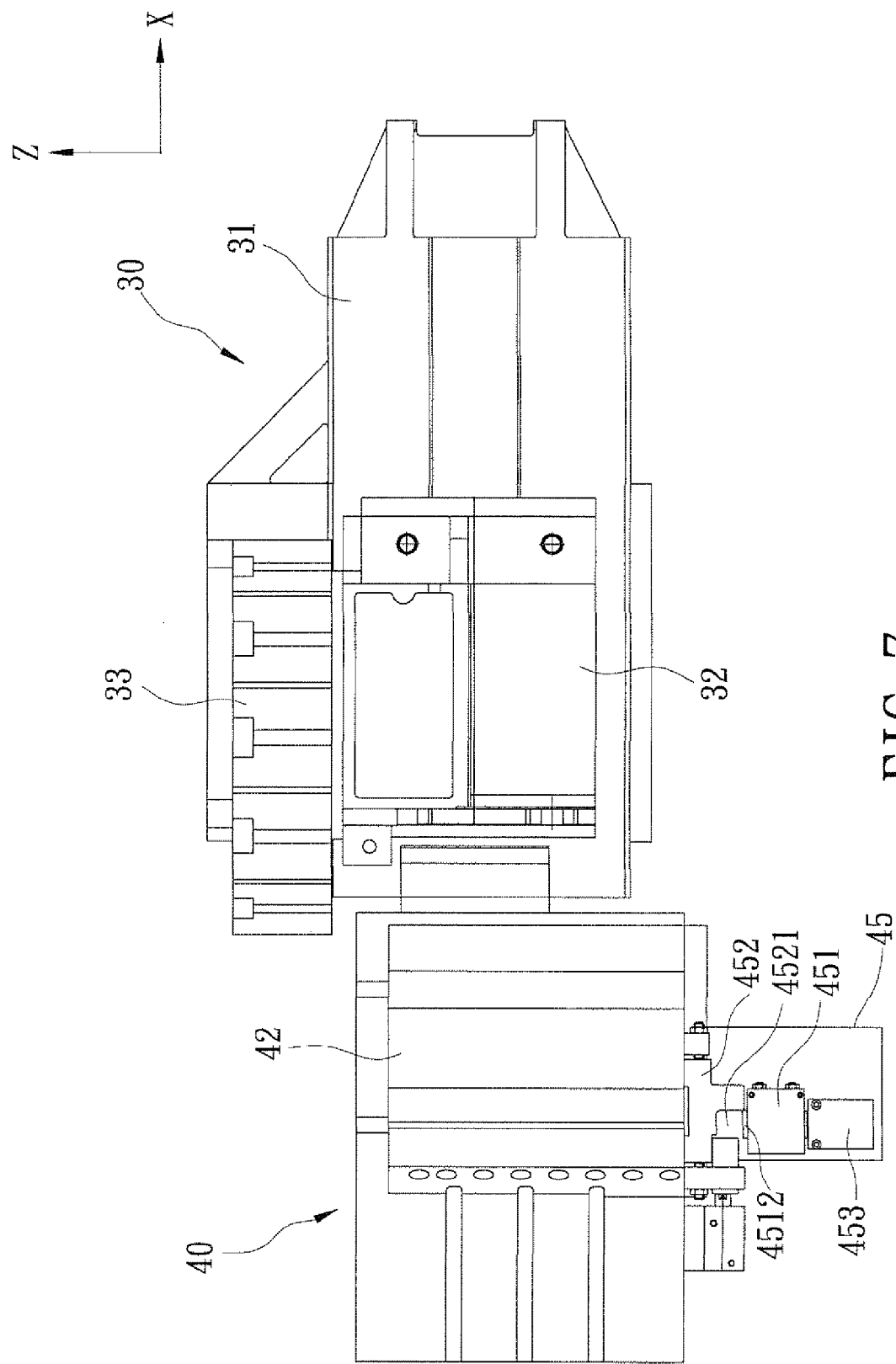
FIG. 7 is a schematic top view of the turret and the tailstock of the preferred embodiment.

The bottom seat 41 further has two guide seats 430 provided respectively on a left front end and a left rear end of the bottom seat 41, and two hydraulic cylinders 431 disposed respectively on right sides of the guide seats 430. The first plungers 432, 432' are mounted movably and respectively in the hydraulic cylinders 431. Each first plunger 432, 432' has one end 4321, 4321' extending into the respective guide seat 430 so as to be guided by the same toward the coupling groove 342, 342' in a respective connecting seat 34, 34'. When the ends 4321, 4321' of the first plungers 432, 432' extend retractably into the coupling grooves 342, 342' in the respective connecting seats 34, 34' so that the end 4321 of the first plunger 432 is disposed between the contact pins 341 of the connecting seat 34 and the end 4321' of the first plunger 432' is disposed between the contact pin 341' and the other end portion of the connecting seat 34', the saddle 31 at this time can drive the bottom seat 41 to move therealong toward the headstock 20 along the longitudinal direction (Z), as best shown in FIG. 6.

Figure 10:
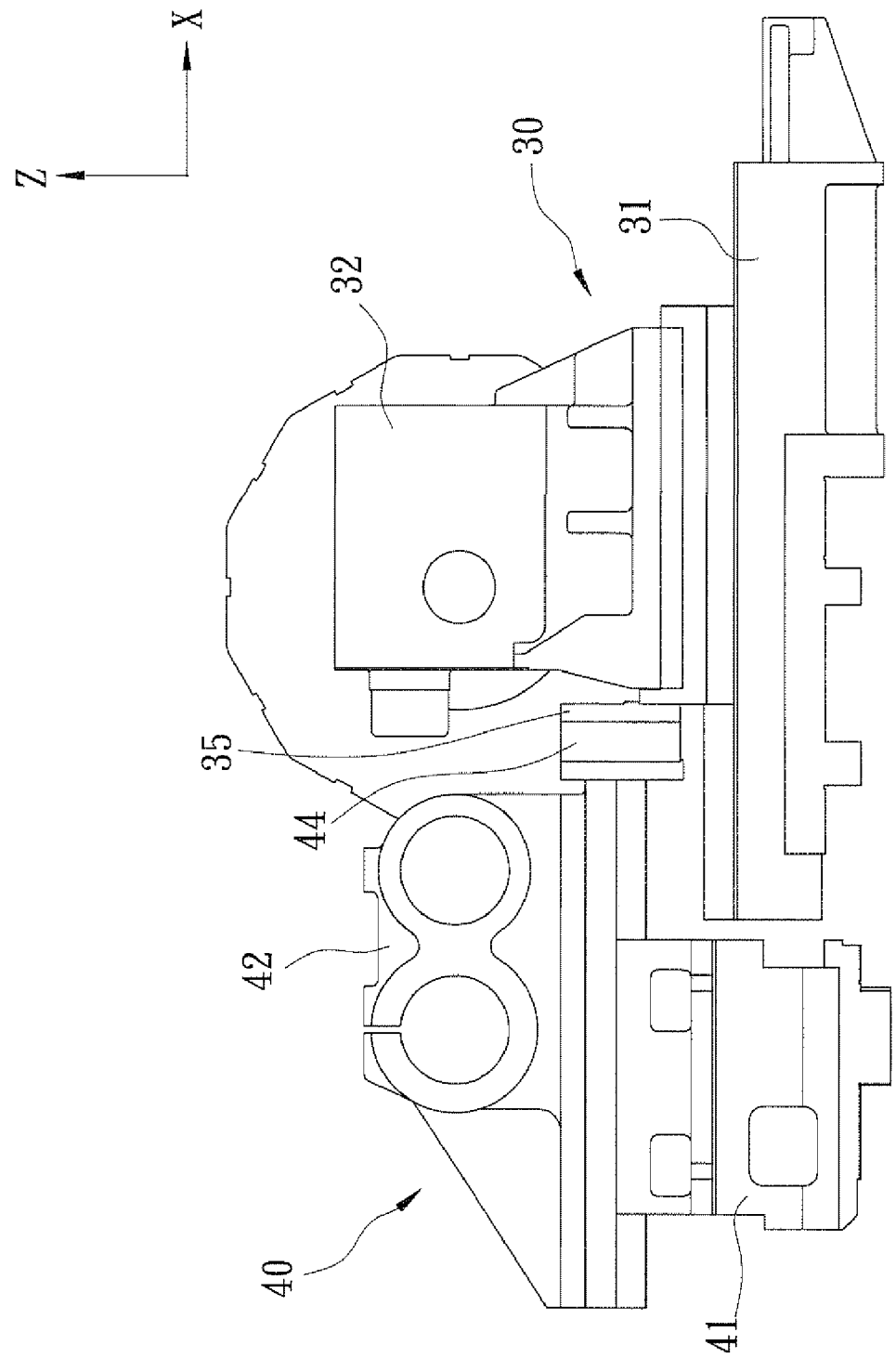
FIG. 10 is a view similar to FIG. 9, but illustrating how the turret is connected to the tailstock to move the same to a transverse direction.

The second coupler unit is provided to couple releasably the turret body 32 and the tailstock body 42. In this embodiment, the second coupler unit includes a magnetically attractable member 35 fixed on a right end of the turret body 32, and a magnetic attraction member 44 fixed on a left end of the tailstock body 42. The magnetically attractable member 35 is configured as a metal plate having a predetermined area. The magnetic attraction member 44 is configured as an electromagnet. In this embodiment, the electromagnet has a permanent electromagnetic chuck which can produce a large magnetic force of about 2.1 tons. Alternatively, a larger magnetic force may be produced as required. When the magnetically attractable member 35 is attracted by the magnetic attraction member 44, the turret body 32 at this time can drive the tailstock body 42 to move therealong in the transverse direction (X), as best shown in FIG. 10.

Figure 3:
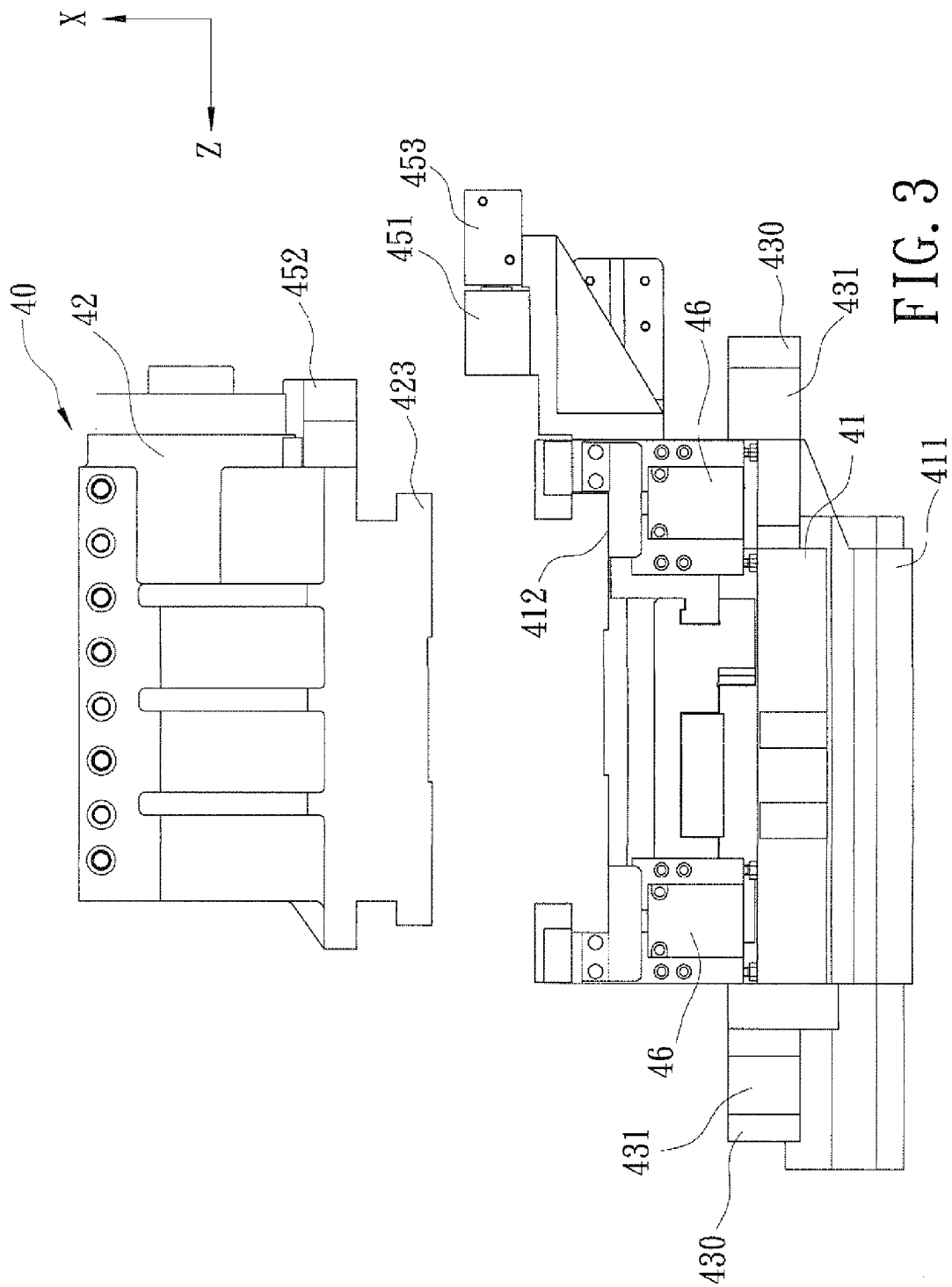
FIG. 3 is a schematic right side view of a bottom seat and a tailstock body of the tailstock of the preferred embodiment.
Figure 4:
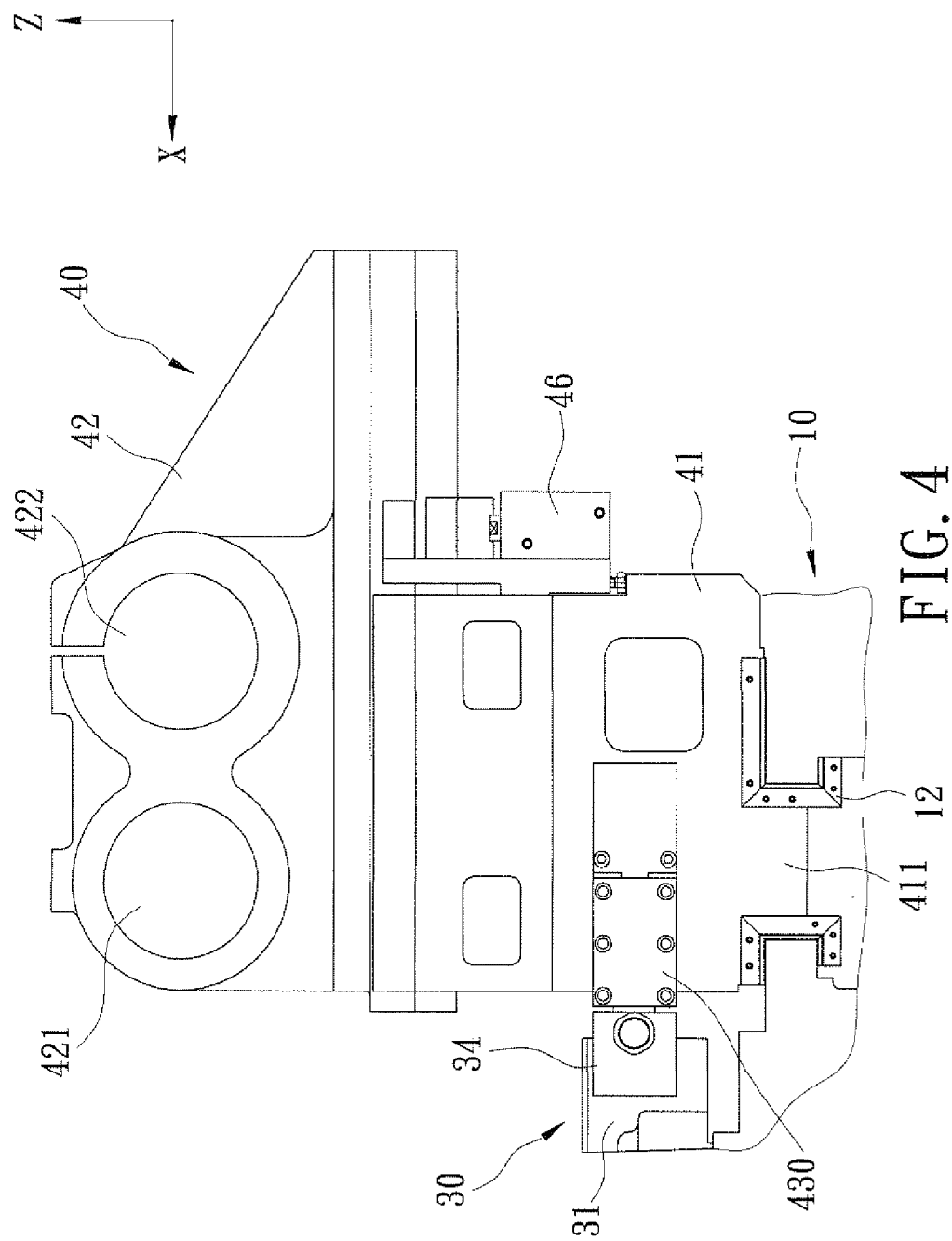
FIG. 4 is a schematic front view of the tailstock of the preferred embodiment.
Figure 8:
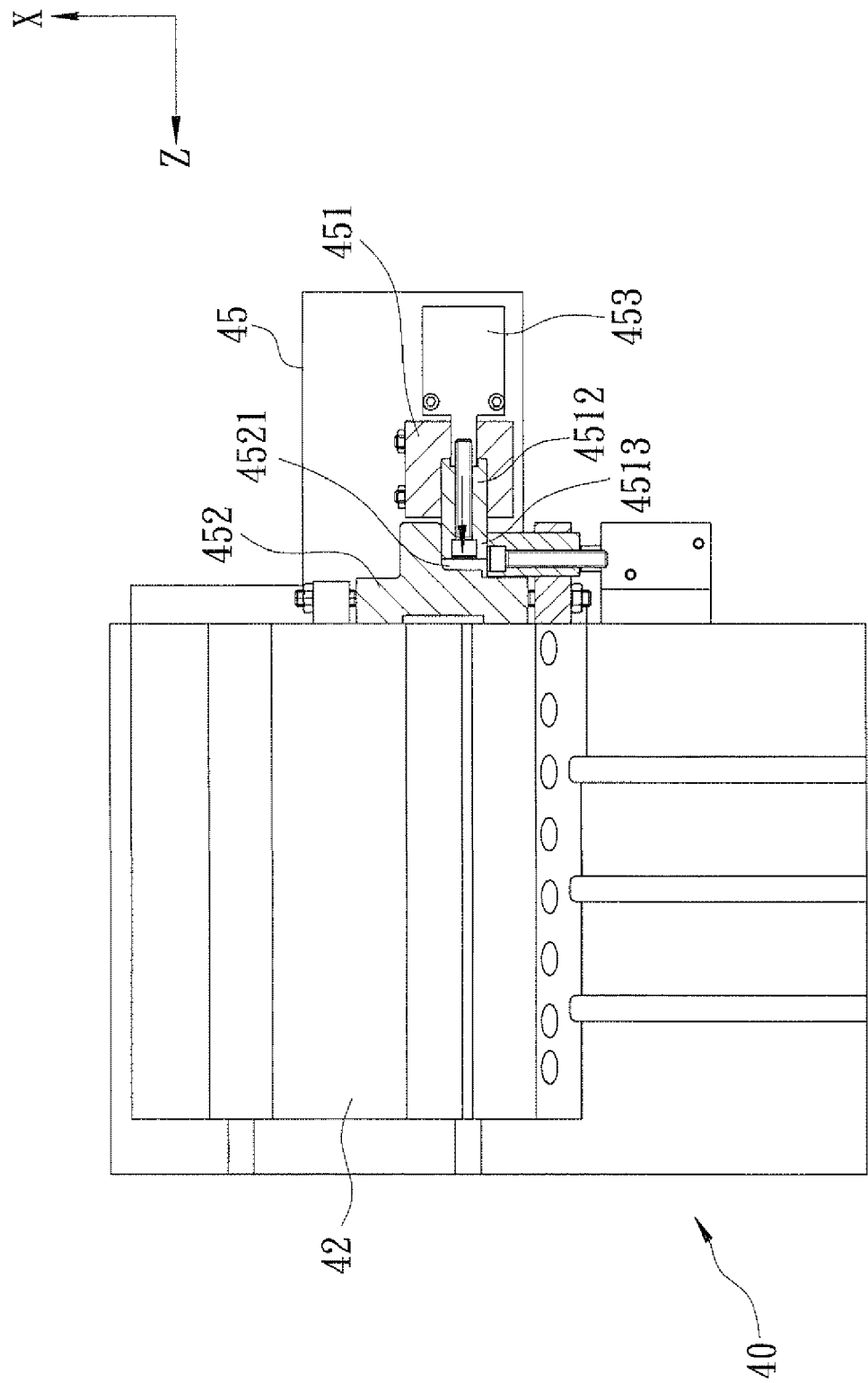
FIG. 8 is a schematic top view of the tailstock of the preferred embodiment.

The tailstock 40 further includes a locking device 45 (see FIGS. 2, 3, 7, and 8) and two brake devices 46 (see FIG. 3). The locking device 45 is provided to lock releasably the tailstock body 42 from moving relative to the bottom seat 41, and includes a locking seat 452 and a second plunger 4512. The locking seat 452 is fixed to a rear end of the tailstock body 42, and has a locking groove 4521 (see FIG. 7). The bottom seat 41 further has a guide seat 451 (see FIG. 3) fixed to a top rear end thereof, and a hydraulic cylinder 453 disposed rearwardly of the guide seat 451. The second plunger 4512 is mounted movably in the hydraulic cylinder 453, and has one end 4513 extending into the guide seat 451 so as to be guided by the same toward the locking groove 4512. When the end 4513 of the second plunger 4512 extends retractably into the locking groove 4512, as shown in FIG. 8, the tailstock body 42 is quickly locked in a particular position. In this embodiment, this particular position is the position where the mandrel 421 is aligned with a central point of the chuck 21.

The brake devices 46, as shown in FIG. 3, are disposed respectively on a right front end and a right rear end of the bottom seat 41. Each brake device 46 has a spindle (not shown) provided in an inner portion thereof and movable upwardly. The spindles of the brake devices 46 abut respectively against left and right portions of the bottom slide 423 of the tailstock body 42 so as to stop movement of the tailstock body 42 relative to the bottom seat 41. That is, operation of the spindles of the brake devices 46 is such that the tailstock body 42 is prevented stably from moving along the transverse direction (X).

A processing method using the lathe machine of the present invention comprises the steps of mounting the workpiece 100 on the headstock 20, mounting the cutter 200 on the tailstock 40, coupling the tailstock 40 to the turret 30, and controlling the turret 30 so that the tailstock 40 is moved in the longitudinal and transverse directions (Z, X) and so that the cutter 200 is moved to the workpiece 100 and performs an axially cutting operation and a radially cutting operation to form a bore with a large hole diameter or a deep inner hole in the workpiece 100.

An alternative processing method using the lathe machine of the present invention comprises the steps of mounting the workpiece 100 on the headstock 20, mounting the cutter 200 on the tailstock 40, and powering the tailstock 40 to move in the longitudinal and transverse directions (Z, X) of the lathe machine so that the cutter 200 is moved to the workpiece 100 to perform an axially cutting operation and a radially cutting operation to form a bore in the workpiece 100. The tailstock 40 in this embodiment is further provided with drive devices (not shown) to respectively drive the tailstock 40 along the longitudinal direction (Z) and the transverse direction (X) without interfering with the turret 30. In this embodiment, the turret 30 can perform an outer diameter cutting operation of the workpiece 100, while the tailstock 40 can perform an inner diameter cutting operation of the workpiece 100. The cutter 200 performs an inner hole boring of the workpiece 100.

Figure 5:
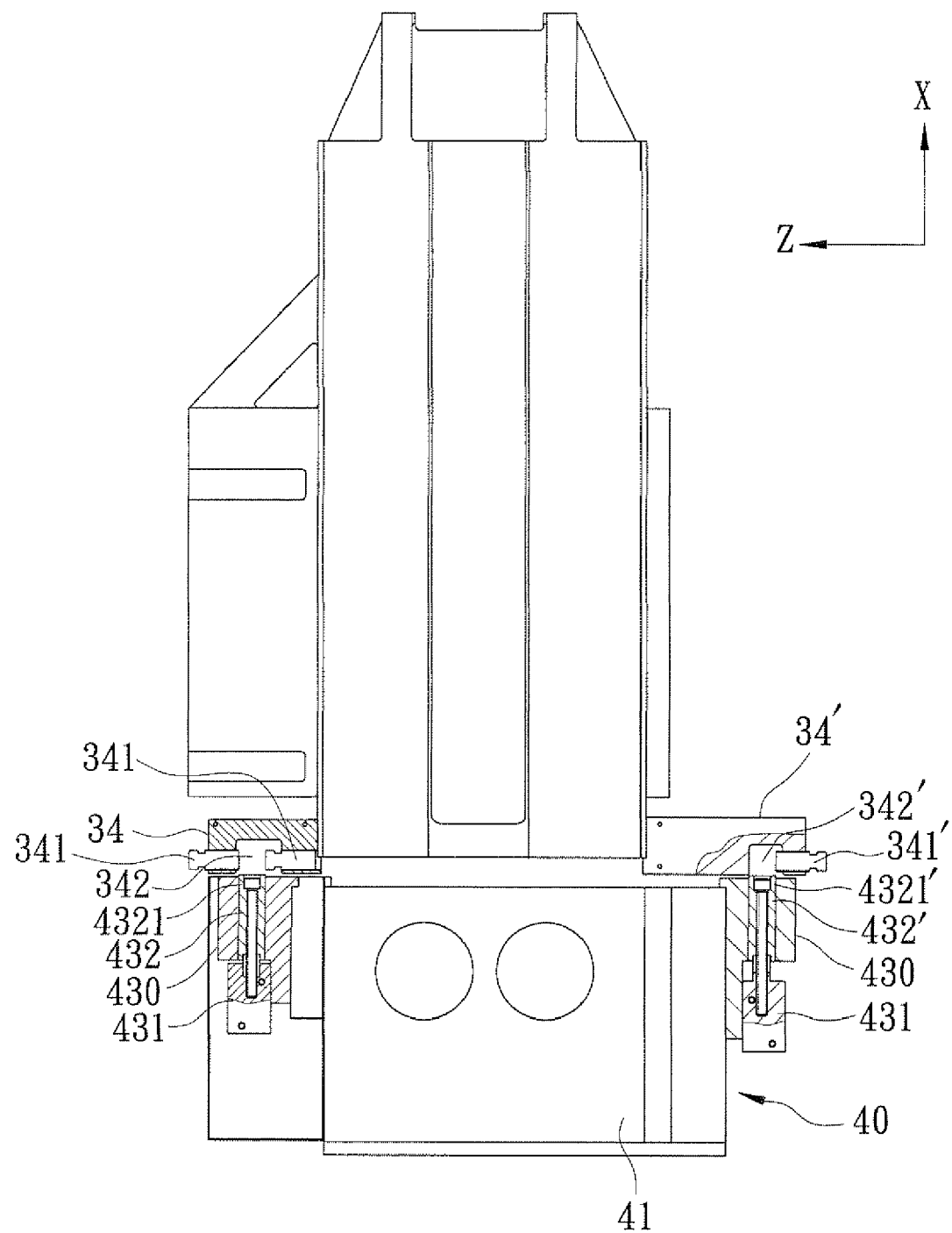
FIG. 5 is a bottom view of the turret and the tailstock of the preferred embodiment.

The action and the anticipated effect of the present invention can be summarized as follows:

With reference to FIGS. 5 and 6, the entire turret 30 is first moved close to the tailstock 40 so as to interconnect the connecting seats 34, 34' and the first plungers 432, 432' of the first coupler unit by extending the first plungers 432, 432' into the coupling grooves 342, 342' in the respective connecting seats 34, 34', thereby permitting the saddle 31 of the turret 30 to drive the bottom seat 41 of the tailstock 40 to move along the longitudinal direction (Z) toward the headstock 20.

Figure 9:
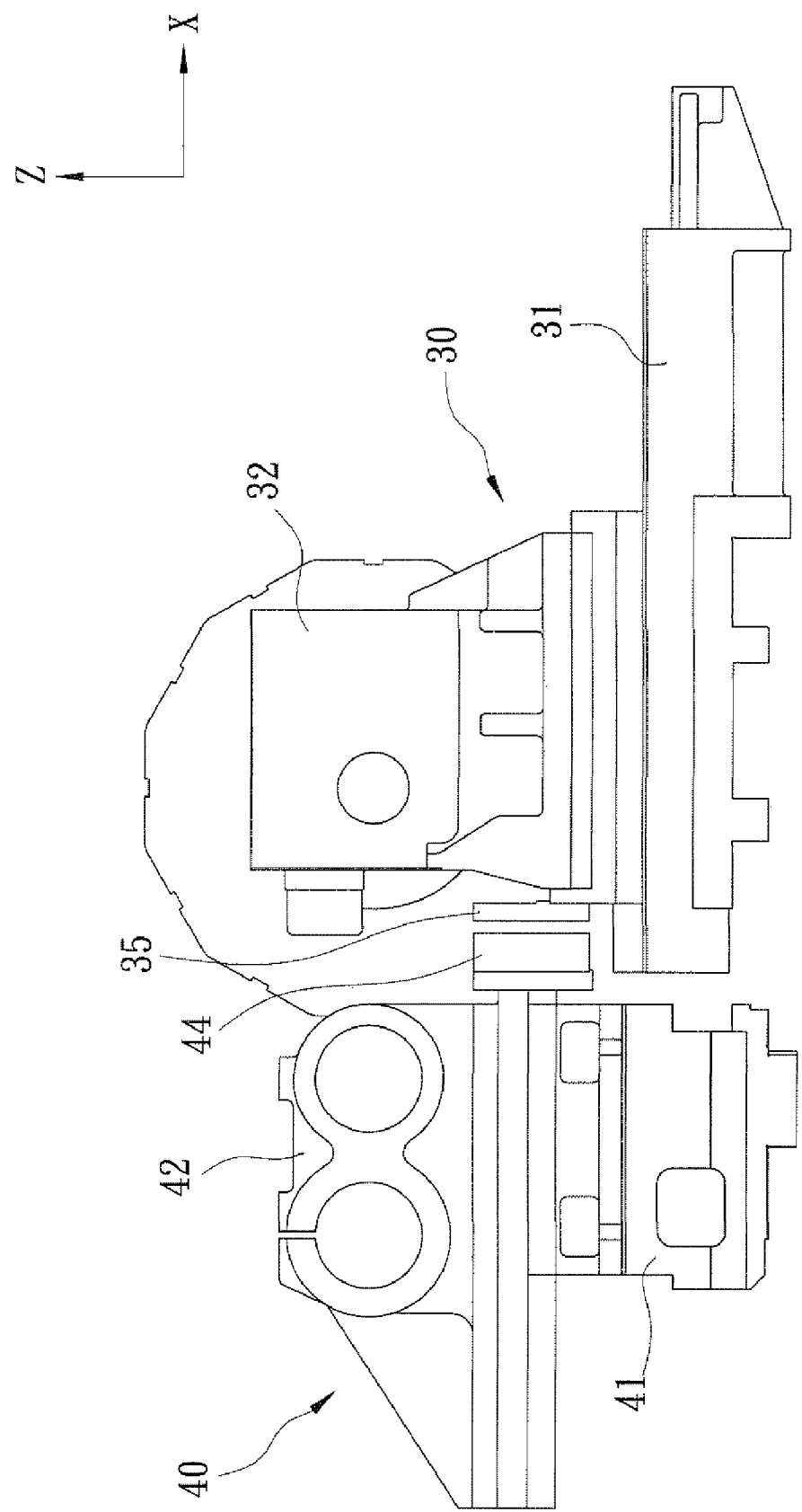
FIG. 9 is a schematic rear view of the turret and the tailstock.

Afterwards, with reference to FIGS. 9 and 10, the magnetically attractable member 35 on the turret body 32 is moved close to the magnetic attraction member 44 on the tailstock body 42, thereby interconnecting the turret body 32 and the tailstock body 42. Hence, the turret body 32 can drive the tailstock body 42 to move along the transverse direction (X).

Figure 11:
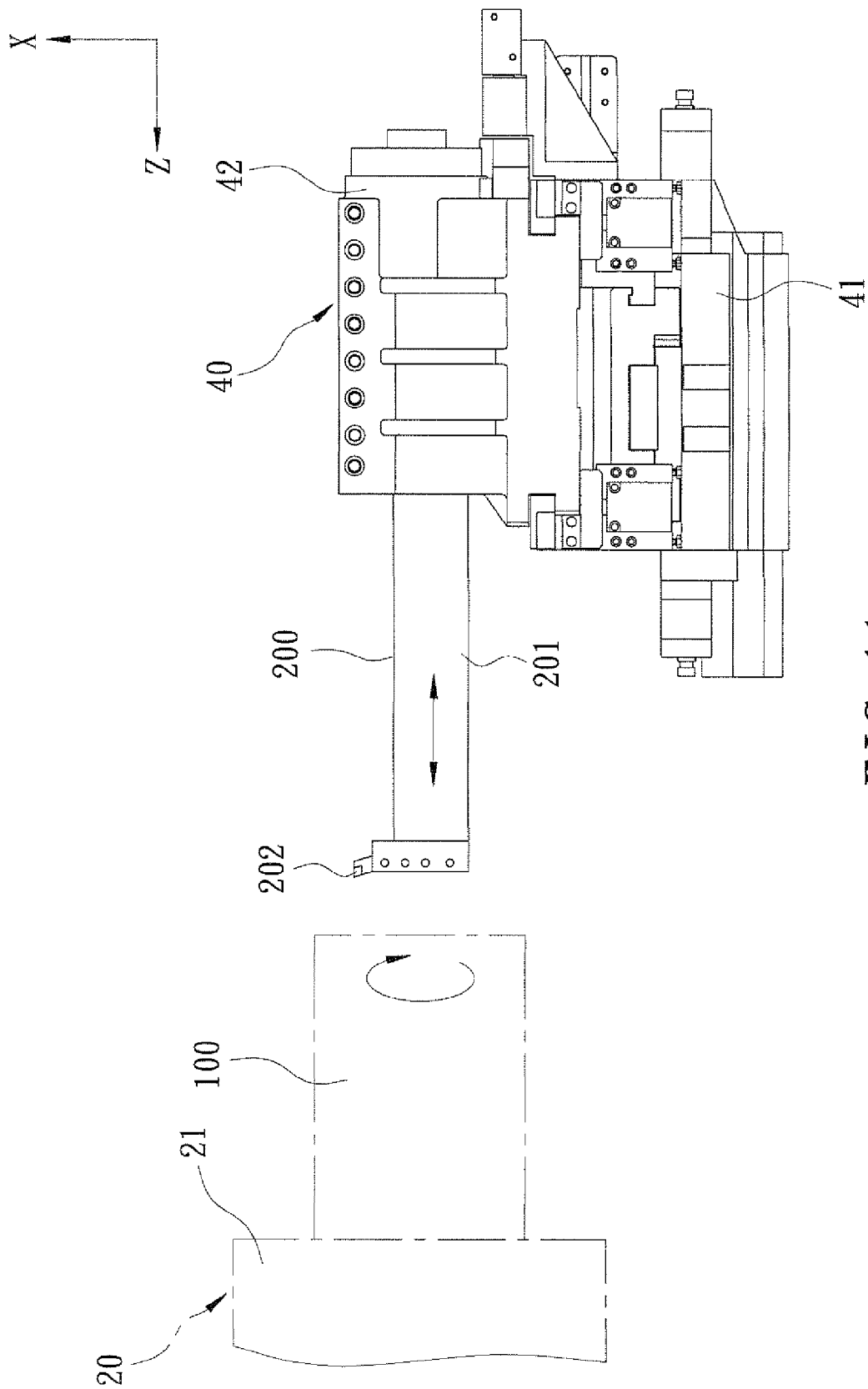
FIG. 11 illustrates a cutter that is mounted on the tailstock moving longitudinally toward a workpiece.

With reference to FIGS. 9 and 11, to machine the workpiece 100 so as to form a bore with a large hole diameter or a deep inner hole, since the turret body 32 can drive the tailstock body 42 to move along the transverse direction (X), the cutter 200 can perform a radially cutting operation of the workpiece 100 so that the workpiece 100 can be formed with a large diameter inner hole. By controlling the transverse movement of the turret body 32 by a predetermined amount, the tailstock body 42 is control led to move a distance along the transverse direction (X), so that the size of the inner diameter of the workplace 100 to be machined can be controlled. Further, since the saddle 31 can drive the bottom seat 41 to move along the longitudinal direction (Z), the cutter 200 can perform an axially cutting operation of the workpiece 100. By controlling the longitudinal movement of the saddle 31 by a predetermined amount, the bottom seat 41 is controlled to move a distance along the longitudinal direction (Z), so that the depth of the inner hole of the workpiece 100 to be machined can be controlled.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A lathe machine comprising:
   a bed;
   a headstock mounted fixedly on a front part of said bed for holding a workpiece;
   a turret including a saddle mounted on a rear part of said bed and movable along a longitudinal direction toward said headstock, and a turret body mounted on said saddle and movable along a transverse direction on said saddle;
   a tailstock including a bottom seat mounted on a rear part of said bed at one side of said saddle and movable along said longitudinal direction toward said headstock, a tailstock body mounted movably on said bottom seat, and a cutter disposed on a front end of said tailstock body and adapted to machine the workpiece;
   a first coupler unit to couple releasably said saddle and said bottom seat so that said bottom seat can be driven by said saddle to move along said longitudinal direction toward said headstock, said first coupler unit including a connecting seat provided on one of said saddle and said bottom seat, and a first plunger provided on the other one of said saddle and said bottom seat and being extendable retractably into said connecting seat; and
   a second coupler unit to couple releasably said turret body and said tailstock body so that said tailstock body can be driven by said turret body to move along said transverse direction, said second coupler unit including a magnetic attraction member provided on one of said turret body and said tailstock body, and a magnetically attractable member provided on the other one of said turret body and said tailstock body to be attracted by said magnetic attraction member.

2. The lathe machine of claim 1, wherein said connecting seat is provided on one end of said saddle, said first plunger being provided on one end of said bottom seat, said connecting seat defining a coupling groove to receive one end of said first plunger, and having a contact pin contacting said one end of said first plunger when said first plunger extends into said coupling groove.

3. The lathe machine of claim 1, wherein said magnetically attractable member is provided on one end of said turret body, and said magnetic attraction member is an electromagnetic member provided on one end of said tailstock body.

4. The lathe machine of claim 1, wherein said bottom seat has a top side provided with a transverse rail, said tailstock body having a bottom slide engaged movably with said transverse rail so as to move along said transverse rail and in said transverse direction.

5. The lathe machine of claim 4, wherein said bottom seat further has a brake device to abut against said bottom slide so as to stop movement of said tailstock body relative to said bottom seat.

6. The lathe machine of claim 1, wherein said tailstock further includes a locking device for locking releasably said tailstock body from moving relative to said bottom seat, said locking device having a second plunger mounted movably on said bottom seat, and a locking seat provided on said tailstock body and having a locking groove, said second plunger being extendable retractably into said locking groove.

* * * * *